United States Patent [19]
Goelz et al.

[11] 3,818,002
[45] June 18, 1974

[54] PRODUCTION OF DRY SODIUM DICHLOROISOCYANURATE

[75] Inventors: Horst Goelz, Schwetzingen; Dieter Stockburger, Gruenstadt; Manfred Saeuberlich, Beindersheim; Frank Mueller, Maxdorf; Hartwig Fuchs; Karl Von Erden, both of Ludwigshafen, all of Germany

[73] Assignee: Badische Anilin-Soda-Fabrik Aktiengesellschaft, Ludwigshafen/Rhein, Land Rheinland-Pfalz, Germany

[22] Filed: Oct. 29, 1971

[21] Appl. No.: 193,997

[30] Foreign Application Priority Data
Nov. 3, 1970  Germany............................ 2053983

[52] U.S. Cl............................................. 260/248 C
[51] Int. Cl............................................. C07d 55/38
[58] Field of Search................................. 260/248 C

[56] References Cited
UNITED STATES PATENTS
2,913,460  11/1959  Brown et al. ...................... 260/248

*Primary Examiner*—John M. Ford
*Attorney, Agent, or Firm*—Johnston, Keil, Thompson & Shurtleff

[57] ABSTRACT

Production of dry sodium dichloroisocyanurate by spray-drying and up to 50 percent w/w aqueous solution or sussion of the salt in a fluidized bed maintained by inert gases and consisting of finely divided dry sodium dichloroisocyanurate, at from 100° to 300°C.

5 Claims, No Drawings

PRODUCTION OF DRY SODIUM DICHLOROISOCYANURATE

This invention relates to a method of producing dry sodium dichloroisocyanurate.

The production of dry sodium dichloroisocyanuarate from aqueous solutions involves considerable difficulties due to the instability and very good solubility of this compound. Although a large number of processes have already been proposed for the isolation of the anhydrous salt from an aqueous solution, such methods are either so complicated that they cannot be carried out economically on an industrial scale or they are unsatisfactory inasmuch as an unduly heavy loss of active chlorine must be tolerated.

These drawbacks are not overcome when using the method of spray-drying and fluidized bed drying proposed in U.S. Pat. No. 2,913,460 and Japanese Pat. Publication No. 29,588/1968. For example, the loss of active chlorine occurring in the spray-drying method proposed in the U.S. Pat. reaches 4 percent. The method of fluidized disclosed in the said patent publication is too complicated owing to the two-stage procedure required and the necessity for maintaining the water content and temperature within narrow limits.

We have now found that dry sodium dichloroisocyanurate may be obtained in a particularly advantageous manner by the method of spray drying an aqueous solution of the salt, provided that an up to 50 percent w/w aqueous solution or suspension of sodium dichloroisocyanurate is sprayed into a fluidized bed maintained by inert gases and consisting of finely divided dry sodium dichloroisocyanurate, at from 100° to 300°C, whilst the steam is removed with the said gases.

In our new method, the starting material is for example an up to 35 percent w/w aqueous solution or an up to 50 percent w/w aqueous suspension of the salt, the suspension containing from about 10 to 30 percent by weight of dissolved sodium salt and from about 40 to 20 percent by weight of said sodium salt in suspended solid form. Conveniently, aqueous solutions are used which have concentrations of from 10 to 35 percent by weight and preferably of from 20 to 22 percent by weight.

The fluidized bed is made up of finely divided dry sodium dichloroisocyanurate having a residual moisture content of not more than 2 percent by weight and preferably not more than 0.2 percent by weight, this dry material being placed in position before the solution of sodium dichloroisocyanurate is sprayed into the fluidized bed. The particle size of said dry material is conveniently between 0.05 and 1.0 mm and preferably between 0.15 and 0.4 mm. The charge of dry salt in the fluidized bed is from about 30 to 400 and preferably from 120 to 150 kg/m² of sieve plate.

The fluidizing and drying medium is a gas which has been heated to a temperature in the range stated and which does not react with the sodium dichloroisocyanurate in an undesirable manner under the conditions of the process, for example air, nitrogen or carbon dioxide. The inlet temperature of the inert gas is from 100° to 300°C and preferably from 180° to 230°C.

The gas velocity is from 0.5 to 2.5 m/s and preferably from 1.0 to 1.5 m/s. About 20 to 50 kg and preferably from 30 to 40 kg or air are required to vaporize 1 kg of water.

Our new method is carried out, for example, by spraying the salt solution through one or more nozzles, which may be one-component or two-component nozzles, from below, from above or from the side into a fluidized bed containing the dry salt, while the gas is fed to the fluidized bed from below through a sieve plate or fritted glass disk. The feed should be adjusted so that the gas temperature at the outlet, which is substantially the same as the temperature of the product, is from 50° to 210°C and preferably from 100° to 150°C. Whilst the steam is removed with the gas, the dry sodium dichloroisocyanurate obtained in granular form is removed from the fluidized bed dryer. It is advantageously sifted into three fractions: fines, useful fraction and tails. In order to retain very fine salt particles from the exhaust air, cyclones and filters are advantageously used. The fines may be recycled to the fluidized bed. If desired, the tails may be ground and also returned to the fluidized bed.

One particularly desirable advantage of our new method is that the dry sodium dichloroisocyanurate is obtained in granular form and assumes a constant particle size distribution after only a short starting period. This makes the process highly suitable for the continuous production of dry sodium dichloroisocyanurate.

The method of the invention, due to the surprisingly rapid drying rate achieved thereby, produces dust-free, compact granular material showing good free-flowing properties. The loss of active chlorine is low at 0.7 to 1.3 percent. Thus the process of the invention makes it possible to prepare dry sodium dichloroisocyanurate from aqueous solution in a particularly advantageous and highly economical manner.

EXAMPLE

A fluidized bed drying plant is used, which consists of a vertical tube having a sieve plate fitted at its bottom end. The sieve plate consists of a slotted plate having a perforated area of 4.5 percent and a cross-sectional area of 0.1 m². The cross-sectional are a of the tube increases to 0.2 m² in its upper half. 15 kg of anhydrous sodium dichloroisocyanurate are placed in this dryer. 16 liters per hour of a 20 percent w/w aqueous sodium dichloroisocyanurate solution are then sprayed into the fluidized bed from below through a two-component nozzle disposed in the center of the sieve plate. 480 kg/hr of air heated at from 205° to 210°C are simultaneously passed up through the sieve plate. The temperature of the air and product in the fluidized bed is thus maintained at from 110° to 120°C, the velocity of the air being from 1.2 to 1.3 m/s. The steam formed is removed with the air through a cyclone and a bag filter to the atmosphere. The solid particles retained in the cyclone are continuously recycled to the fluidized bed via a star feeder and a lock. The dried product is removed from the dryer batchwise at intervals of 30 minutes via an overflow. About 2.5 kg of solid material are removed each time, of which 1.0 kg is finely ground and returned to the dryer. During a continuous run of 12.5 hours, the amount of sodium salt originally placed in the dryer is replaced 3.2 times, this being equivalent to a single-pass residence time of 3.5 hours.

The product removed from the dryer has a constant particle size distribution after only a few hours, corresponding to the following siftings (expressed in terms of material retained in percent at various mesh sizes):

4 percent at 3.2 mm; 14 percent at 2.0 mm; 28 percent at 1.6 mm; 75 percent at 0.8 mm. The moisture content is 0%. The active chlorine content is between 62.2 and 62.7 percent, the initial active chlorine content of the product placed in the dryer and of the solution being from 63 to 64 percent.

We claim:

1. A method of producing dry sodium dichloroisocyanurate by spray-drying an aqueous solution of the salt, which method comprises spraying an up to 50 percent w/w aqueous solution or suspension of sodium dichloroisocyanurate into a fluidized bed of finely divided dry sodium dichloroisocyanurate maintained in the fluidized stated by an inert gas, at from 100° to 300°C, the steam being removed with the said gas.

2. A method as claimed in claim 1, wherein a from 10 to 35 percent w/w aqueous sodium dichloroisocyanurate solution is sprayed into the fluidized bed.

3. A method as claimed in claim 1 wherein the amount of dry sodium dichloroisocyanurate initially placed on the sieve plate is about 30 to 400 kg/m$^2$ of sieve plate.

4. A method as claimed in claim 1 wherein the temperature of the said inert gas as it enters the fluidized bed is from 100° to 300°C.

5. A method as claimed in claim 1 which is carried out continuously.

* * * * *